United States Patent
Singh et al.

(10) Patent No.: US 8,995,987 B1
(45) Date of Patent: Mar. 31, 2015

(54) PROVIDING NON-LTE COMMUNICATIONS OVER LTE SIGNALING BASED ON CONGESTION

(71) Applicant: Sprint Communications Company L.P., Overland Park, KS (US)

(72) Inventors: Jasinder Pal Singh, Olathe, KS (US); Jason Peter Sigg, Overland Park, KS (US); Maulik K. Shah, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 258 days.

(21) Appl. No.: 13/683,135

(22) Filed: Nov. 21, 2012

(51) Int. Cl.
*H04W 24/00* (2009.01)
*H04W 28/02* (2009.01)

(52) U.S. Cl.
CPC .................................. *H04W 28/0289* (2013.01)
USPC ........................................................ 455/423

(58) Field of Classification Search
CPC .. H04W 40/12; H04W 28/0231; H04W 40/04
USPC ........................................................ 455/423
See application file for complete search history.

(56) References Cited

U.S. PATENT DOCUMENTS

| | | | |
|---|---|---|---|
| 8,811,178 B2 * | 8/2014 | Kutscher et al. | 370/235 |
| 2010/0034176 A1 * | 2/2010 | Heo et al. | 370/335 |
| 2010/0273515 A1 * | 10/2010 | Fabien et al. | 455/509 |
| 2011/0059739 A1 * | 3/2011 | Huang | 455/435.1 |
| 2011/0077030 A1 * | 3/2011 | Wigren et al. | 455/456.5 |
| 2011/0110228 A1 * | 5/2011 | de Franca Lima et al. | 370/230 |
| 2011/0188448 A1 * | 8/2011 | Griot et al. | 370/328 |
| 2011/0237257 A1 * | 9/2011 | Soliman et al. | 455/436 |
| 2011/0267948 A1 | 11/2011 | Koc et al. | |
| 2011/0275359 A1 * | 11/2011 | Sebire et al. | 455/422.1 |
| 2011/0286347 A1 * | 11/2011 | Mohanty et al. | 370/252 |
| 2012/0028661 A1 * | 2/2012 | Fang et al. | 455/466 |
| 2012/0044824 A1 * | 2/2012 | Osterling et al. | 370/252 |
| 2012/0170503 A1 * | 7/2012 | Kelley et al. | 370/312 |
| 2012/0213162 A1 * | 8/2012 | Koo et al. | 370/329 |
| 2012/0295612 A1 * | 11/2012 | Yokoyama | 455/426.1 |
| 2013/0223335 A1 * | 8/2013 | Kwag et al. | 370/328 |
| 2013/0265884 A1 * | 10/2013 | Brombal et al. | 370/242 |

* cited by examiner

*Primary Examiner* — Qun Shen

(57) ABSTRACT

Systems, methods, and software for operating a wireless communication system are provided herein. In one example, a method of operating a wireless communication system is provided. The method includes transferring, for delivery to user devices, overhead signaling for a non-long term evolution (LTE) communication protocol over an LTE signaling pathway. The method also includes identifying control channel congestion for wireless communications exchanged with the user devices over a LTE signaling pathway. The method also includes determining when the control channel congestion exceeds a congestion threshold, and responsively transferring the overhead signaling for the non-LTE communication protocol using a non-LTE signaling pathway to ones of the user devices having power headrooms exceeding a headroom threshold.

18 Claims, 6 Drawing Sheets

US 8,995,987 B1

PROVIDING NON-LTE COMMUNICATIONS OVER LTE SIGNALING BASED ON CONGESTION

TECHNICAL FIELD

Aspects of the disclosure are related to the field of communications, and in particular, providing non-long term evolution (LTE) communications to user devices over LTE signaling based on congestion in wireless communication networks.

TECHNICAL BACKGROUND

Wireless communication systems typically include wireless access systems or radio access networks with equipment such as wireless access nodes along with various control and routing nodes, which provide wireless access to communication services for user devices over wireless links. A typical wireless communication system includes systems to provide wireless access across a geographic region, with wireless coverage areas associated with individual wireless access nodes. The wireless access systems exchange user communications between user devices and service providers for the communication services. Communication services typically include voice calls, data exchange, web pages, streaming media, or text messages, among other communication services.

In some wireless communication systems, more than one wireless communication protocol or wireless frequency spectrum can be employed. For example, a first wireless access mode employing a first wireless communication protocol can be deployed along with a second wireless access mode employing a second wireless communication protocol. Separate wireless access equipment can be deployed for each wireless access mode, such as when a Long Term Evolution (LTE) wireless network is deployed over a similar geographic area as a legacy or non-LTE wireless network. User devices can be configured to support multiple wireless access modes, such as including multiple transceivers or antenna systems to communicate with one or more wireless networks.

Overview

Systems, methods, and software for operating a wireless communication system are provided herein. In one example, a method of operating a wireless communication system is provided. The method includes transferring, for delivery to user devices, overhead signaling for a non-long term evolution (LTE) communication protocol over an LTE signaling pathway. The method also includes identifying control channel congestion for wireless communications exchanged with the user devices over a LTE signaling pathway. The method also includes determining when the control channel congestion exceeds a congestion threshold, and responsively transferring the overhead signaling for the non-LTE communication protocol using a non-LTE signaling pathway to ones of the user devices having power headrooms exceeding a headroom threshold.

In another example, a wireless communication system is provided. The wireless communication system includes a communication network configured to transfer, for delivery to user devices, overhead signaling for a non-long term evolution (LTE) communication protocol over an LTE signaling pathway. The wireless communication system also includes a control node configured to identify control channel congestion for wireless communications exchanged with the user devices over a LTE signaling pathway, and determine when the control channel congestion exceeds a congestion threshold. Responsive to the control channel congestion exceeding the congestion threshold, the communication network is configured to transfer the overhead signaling for the non-LTE communication protocol using a non-LTE signaling pathway to ones of the user devices having power headrooms exceeding a headroom threshold.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
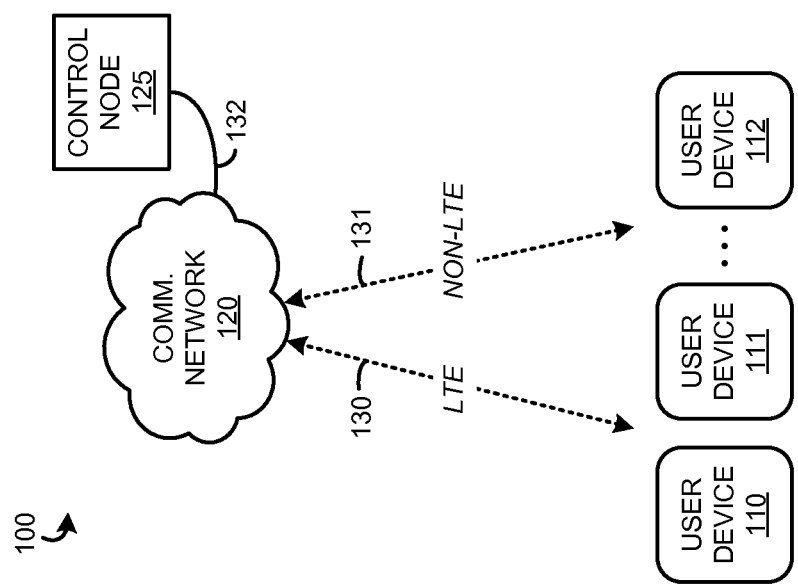
FIG. 1 is a system diagram illustrating a communication system.

FIG. 1 is a system diagram illustrating wireless communication system 100. Wireless communication system 100 includes user devices 110-112, communication network 120, and control node 125. Communication network 120 and control node 125 communicate over link 132. User devices 110-112 can each communicate with communication network 120 over any of wireless links 130-131. User devices 110-112 can each receive wireless access to communication services over any of links 130-131 from communication network 120. The communication services can include voice calls, data exchange, web pages, streaming media, or text messages, among other communication services.

Figure 2:
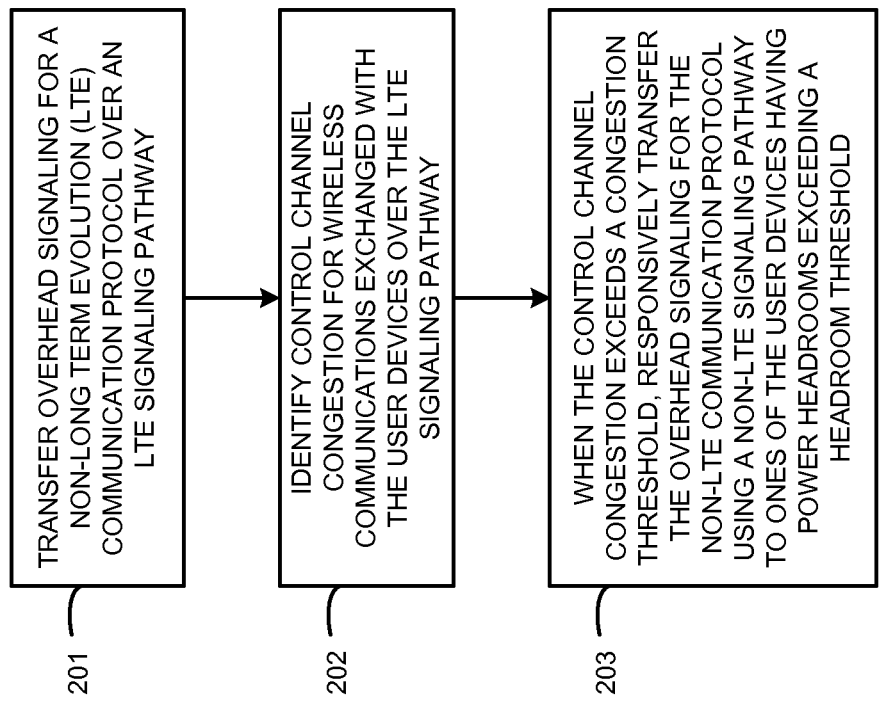
FIG. 2 is a flow diagram illustrating a method of operation of a communication system.

FIG. 2 illustrates a flow diagram which describes an example method of operation of a wireless communication system, such as for wireless communication system 100 of FIG. 1. The operations of FIG. 2 are referenced parenthetically in the description below.

In FIG. 2, communication network 120 transfers (201), for delivery to user devices, overhead signaling for a non-long term evolution (LTE) communication protocol over an LTE signaling pathway. In this example, the LTE signaling pathway includes wireless link 130. Further signaling pathways included in communication network 120 can also be associated with the LTE signaling pathway. The overhead signaling for the non-LTE communication protocol typically includes call paging information, system parameter information, text messaging, or other overhead communications for the non-LTE communication protocol. When the non-LTE overhead signaling are transferred over LTE signaling pathway, then user devices can receive the overhead signaling via LTE signaling pathway, and do not need to tune away from the LTE signaling pathway to a non-LTE signaling pathway to receive or monitor the overhead signaling.

As discussed herein, the LTE communication protocol can include the LTE or LTE advanced communication protocols as proposed by the 3rd Generation Partnership Project (3GPP), among other wireless communication protocols. The non-LTE communication protocol can include legacy wireless communication protocols, such as CDMA, GSM, 1xRTT, among other wireless communication protocols, which are transported over a LTE signaling pathway.

Control node 125 identifies (202) control channel congestion for wireless communications exchanged with the user devices over the LTE signaling pathway. Control channel resources are wireless link resources used to transfer overhead communications to user devices, and comprise a portion of the finite wireless resources of a wireless link, such as LTE wireless link 130. Congestion of the control channels can indicate overloading or highly utilized resources for the control channels which can lead to slowdowns and dropped communication sessions, among other conditions. Control channel congestion can be monitored by control node 125, or monitored by elements of communication network 120 and transferred to control node 125. In some examples, control channel congestion is represented by a control channel occupancy level.

Control node 125 determines (203) determines when the control channel congestion exceeds a congestion threshold, and communication network 120 responsively transfers the overhead signaling for the non-LTE communication protocol using a non-LTE signaling pathway to ones of the user devices having power headrooms exceeding a headroom threshold. The congestion threshold can indicate when control channel occupancy has reached a predetermined limit, such as when various resources of LTE wireless link 130 have exceeded a predetermined utilization limit. Responsive to the threshold being exceeded, control node 125 can instruct elements of communication network 120 to shift the overhead signaling for the non-LTE communication protocol away from the LTE signaling pathway. This can include shifting the non-LTE overhead signaling from LTE wireless link 130 to non-LTE wireless link 131.

In this example, control node 125 and communication network 120 responsively transfer the overhead signaling over the non-LTE signaling pathway for ones of the user devices which have power headrooms exceeding the headroom threshold. The ones of the user devices can then receive the overhead signaling for the non-LTE communication protocol over the non-LTE signaling pathway, which in this example includes non-LTE wireless link 131.

Power headroom for a user device can indicate how much transmit power remains for wireless communications of a user device relative to a maximum transmit power. For example, if a first user device is operating at a first transmit power for communicating over LTE wireless link 130, then there is a typically an amount of transmit power remaining which can be used for increasing the transmit power of the first user device, up until a maximum transmit power is reached. For those user devices which are operating with a greater power headroom, then a lower transmit power is typically being used. In some examples, user devices with greater power headrooms are closer in physical proximity to a wireless access node or antenna of communication network 120, as less transmit power is required to communicate effectively. The power headrooms or headroom thresholds can be indicated in decibels, watts, or other units of transmit power. It should be understood that the power headrooms can be power headrooms for transmissions of user devices 110-112 or power headrooms for transmissions of transmitter elements of communication network 120.

Figure 3:
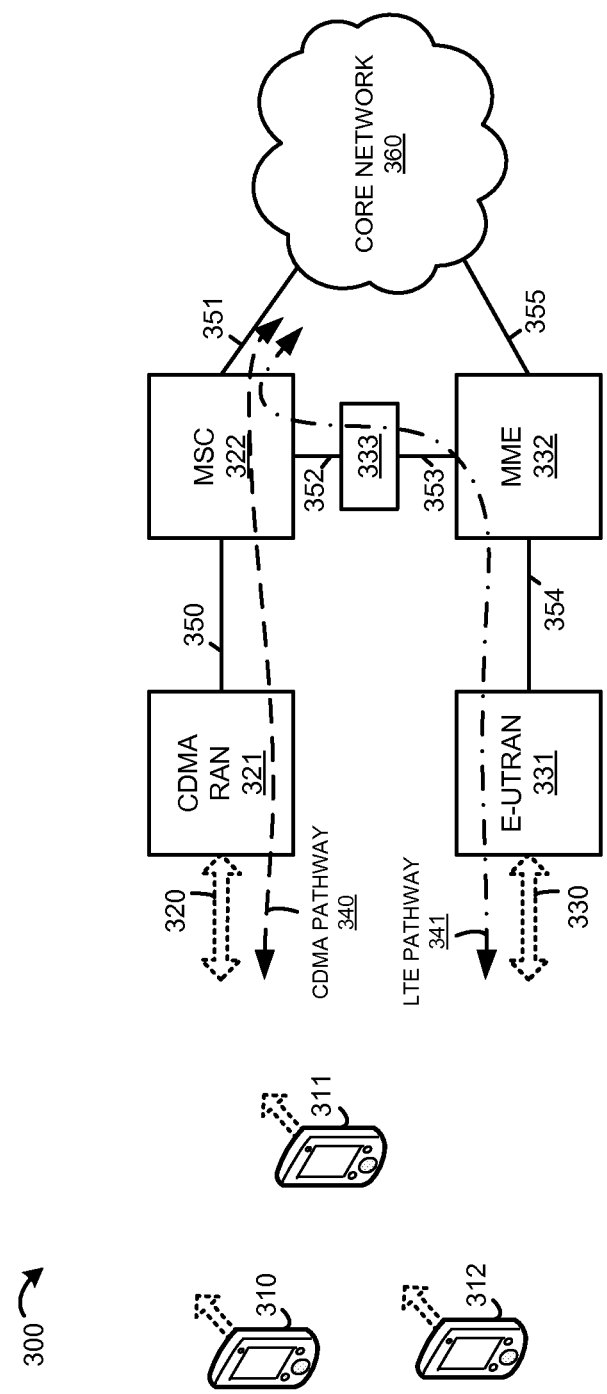
FIG. 3 is a system diagram illustrating a communication system.

FIG. 3 is a system diagram illustrating wireless communication system 300. Communication system 300 includes user devices 310-312, Code Division Multiple Access (CDMA) radio access network (RAN) 321, mobile switching center (MSC) 322, Evolved Universal Terrestrial Radio Access network (E-UTRAN) 331, Mobility Management Entity (MME) 332, interworking function (IWF) node 333, and core network 360. Each of user devices 310-312 comprise dual-mode smartphones in this example and can communicate with any of CDMA RAN 321 and E-UTRAN 331 over associated wireless links. CDMA RAN 321 and MSC 322 communicate over backhaul link 350, which is a T1 link in this example. MSC 322 and core network 360 communicate over link 351, which is an optical network link in this example. E-UTRAN 331 and MME 332 communicate over backhaul link 354, which is a T1 link in this example. MME 332 and core network 360 communicate over link 255, which is an optical network link in this example. IWF 333 and MSC 322 communicate over packet network link 352. IWF 333 and MME 332 communicate over packet network link 353.

Elements 321, 322, 331, 332, 333, and 360 can comprise a communication network or multiple communication networks such as communication network 120 found in FIG. 1, although variations are possible. In operation, elements 321, 322, 331, 332, 333, and 360 provide wireless access to communication services for user devices 310-312.

CDMA RAN 321 includes radio access equipment of a CDMA communication system, and includes CDMA (e.g. non-LTE) signaling pathway 340 in this example comprising wireless link 320, links 350-351, and associated equipment. CDMA RAN 321 can include base stations, wireless access nodes, routers, switches, as well as RF communication circuitry including antennas, amplifiers, filters, RF modulators, transceivers, and signal processing circuitry.

E-UTRAN 331 includes radio access equipment of an LTE communication system, and includes LTE signaling pathway 341 in this example comprising wireless link 330, links 354-355, and associated equipment. E-UTRAN 331 can include base stations, wireless access nodes, routers, switches, as well as RF communication circuitry including antennas, amplifiers, filters, RF modulators, transceivers, and signal processing circuitry.

IWF 333 comprises systems and equipment for identifying control channel congestion, identifying wireless communication power headrooms of user devices, and indicating to transfer communications over a LTE and non-LTE pathways, among other operations. IWF 333 can include communication or network interfaces, as well as computer systems, microprocessors, circuitry, or some other processing devices or software systems, and can be distributed among multiple processing devices. Examples of IWF 333 can also include software such as an operating system, logs, databases, utilities, drivers, networking software, and other software stored on a computer-readable medium. IWF 333 can also include Call Session Control Function (CSCF) equipment, session initiation protocol (SIP) proxy systems, SIP routing systems, SIP monitoring systems, mobile switching centers (MSC), radio access network (RAN) equipment, E-UTRAN equipment, Mobility Management Entity (MME) equipment, interworking functions (IWF), cloud-based systems, database systems, or other systems.

Although IWF 333 is employed for the functionality discussed in this example, in other examples different elements of wireless communication system 300 can be utilized. For example, control channel congestion and power headroom monitoring can occur in elements of E-UTRAN 331, and information related to control channel congestion and power headrooms can be transferred for delivery to IWF 333. The discussion regarding FIGS. 3-5 is not intended to limit the functionality to a particular element, and such processing can be handled across many elements of wireless communication system 300, including elements of core network 360, or a further control node not shown for clarity.

The LTE S102 signaling pathway is employed in LTE systems to ensure delivery of paging information as well as other overhead signaling from a non-LTE communication network using a non-LTE communication protocol, such as for CDMA legacy systems. For example, call paging information indicating incoming calls from core network 360 can be transferred over the LTE signaling pathway 341 for receipt by one or more of user devices 310-312. The call itself occurs over the non-LTE signaling pathway, namely CDMA pathway 340, which can include a 1xRTT communication mode or link for handling of voice calls. Thus, a user device communicating primarily over LTE signaling pathway 341 and receiving wireless access via LTE wireless link 330 can still receive incoming CDMA voice call alerts via the call paging information transported over the S102 interface. Once the call paging information indicates an incoming call, then an affected user device can initiate further signaling to establish the voice call over CDMA pathway 340 using CDMA wireless link 340. However, in many cases, transporting the non-LTE overhead signaling using the S102 signaling pathway can increase the loading on overhead signaling of LTE signaling pathway 341, such as control channels used by the LTE communication protocol for transferring overhead information to user devices.

Core network 360 comprises communication and control systems for providing access to communication services for user devices. In some examples, core network 360 includes equipment to provide wireless access to communication services within different coverage areas to user devices, route communications between content providers and user devices, and facilitate handoffs between equipment of different coverage areas, among other operations. Core network 360 can also comprise further elements such as radio access network (RAN) equipment, E-UTRAN Node B equipment, eNodeB equipment, Evolved Node B equipment, Mobility Management Entity (MME) equipment, interworking functions (IWF), Home Subscriber Servers (HSS), Evolved Universal Terrestrial Radio Access (E-UTRA) network equipment, base stations, base transceiver stations (BTS), base station controllers (BSC), mobile switching centers (MSC), home location registers (HLR), radio node controllers (RNC), call processing systems, authentication, authorization and accounting (AAA) equipment, access service network gateways (ASN-GW), packet data switching nodes (PDSN), home agents (HA), mobility access gateways (MAG), Internet access nodes, telephony service nodes, databases, or other communication and control equipment. Core network 360 can include LTE and CDMA networks and systems, among other types of cellular communication networks.

Figure 4:
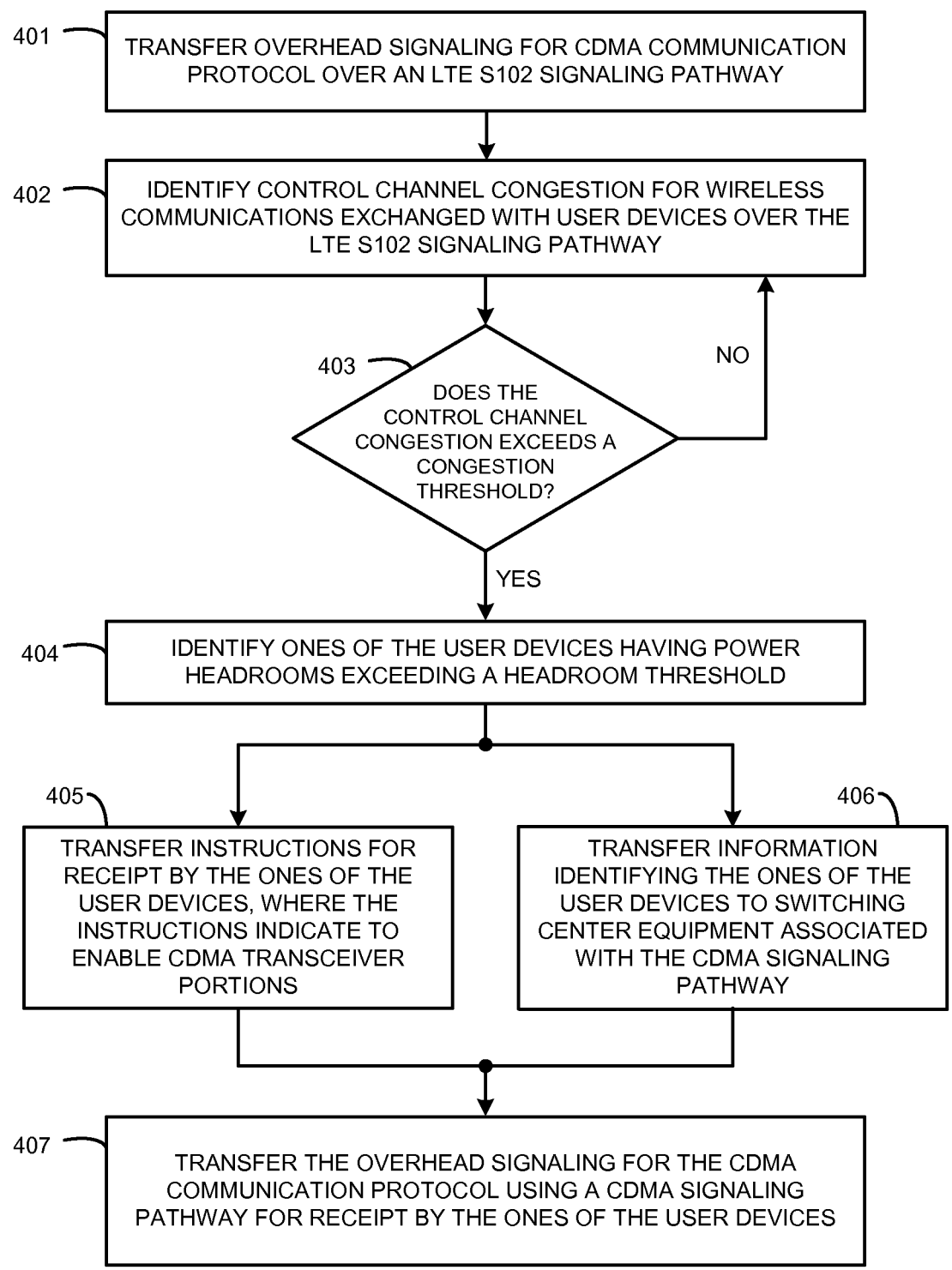
FIG. 4 is a flow diagram illustrating a method of operation of a communication system.
Figure 5:
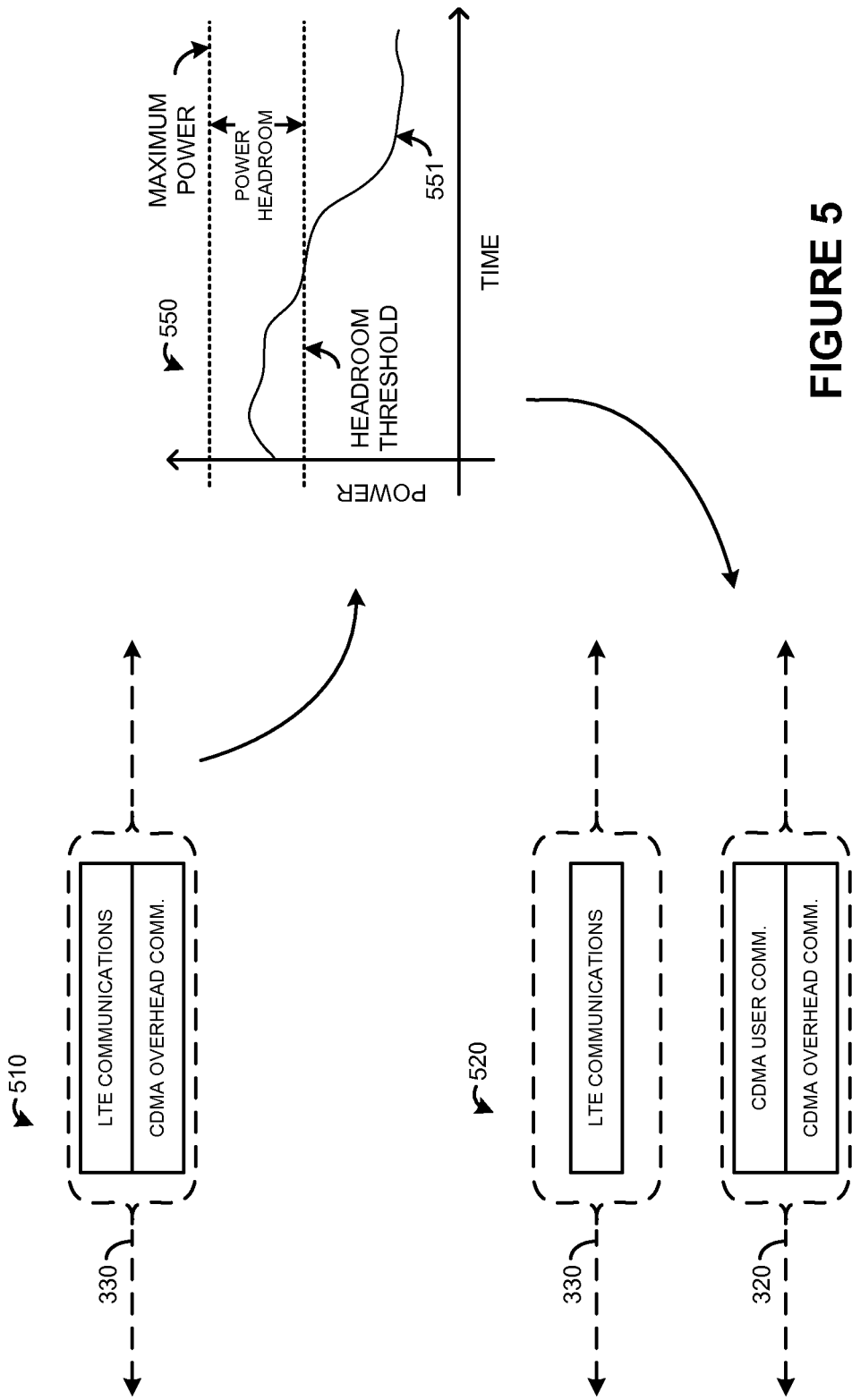
FIG. 5 includes graphs illustrating example signaling.

FIG. 4 illustrates a flow diagram which describes an example method of operation of a wireless communication system, such as for wireless communication system 300 of FIG. 3. The operations of FIG. 4 are referenced parenthetically in the description below.

In FIG. 4, wireless communication system 300 transfers (401) overhead signaling for a CDMA communication protocol over an LTE S102 signaling pathway. In this example, the LTE S102 signaling pathway includes LTE signaling pathway 341, IWF 333, and links 352-353. E-UTRAN 331 transfers the CDMA overhead signaling to user devices 310-312 over LTE wireless link 330. The overhead signaling includes circuit switched communication fall back (CSFB) signaling of at least one of call paging signaling, circuit switched voice call signaling, and text message signaling. Other types of CDMA overhead signaling can be carried over the LTE S102 signaling pathway.

As a further example of LTE signaling pathway 341 associated with LTE wireless link 330, FIG. 5 is provided. FIG. 5 includes first configuration 510 as an example of at least operation 401 of FIG. 4. LTE wireless link 330 is shown as including communications associated with both LTE communications and CDMA overhead communications. The LTE communications can include user and overhead communications for LTE signaling and protocols, while the CDMA overhead communications can include the CSFB signaling, among other CDMA overhead signaling.

IWF 333 identifies (402) control channel congestion for wireless communications exchanged with user devices over the LTE S102 signaling pathway. Control channel resources are resources of LTE wireless link 330 used to transfer overhead communications to user devices, and comprise a portion of the finite wireless resources of LTE wireless link 330. Congestion of the control channels can indicate overloading or highly utilized resources for the control channels which can lead to slowdowns and dropped communication sessions, among other conditions. Control channel congestion can be monitored by IWF 333, or monitored by elements of wireless communication system 300 and transferred to IWF 333. In some examples, control channel congestion includes a control channel occupancy level.

IWF 333 determines (403) if the control channel congestion exceeds a congestion threshold. The congestion threshold can indicate when control channel occupancy has reached a predetermined limit, such as when various resources of LTE wireless link 330 have exceeded a predetermined utilization limit. In further examples, other indicators of high utilization of the resources of LTE wireless link 330 are monitored and compared against a threshold in operation 403.

IWF 333 identifies (404) ones of the user devices having power headrooms exceeding a headroom threshold. In this example, the ones of the user devices having power headrooms exceeding the headroom threshold include user devices 310 and 311, while user device 312 does not have a power headroom that exceeds the headroom threshold. Other configurations of user device power headrooms can be encountered in other examples.

The power headroom for a user device indicates how much transmit power remains for wireless communications of a user device relative to a maximum transmit power. For example, if a first user device is operating at a first transmit power for communicating over LTE wireless link 330, then there is a typically an amount of transmit power remaining which can be used for increasing the transmit power of the first user device, up until a maximum transmit power is reached. For those user devices which are operating with a greater power headroom, then a lower transmit power is typically being used. In some examples, user devices with greater power headrooms are closer in physical proximity to a wireless access node or antenna of E-UTRAN 331, as less transmit power is required to communicate effectively. The transmit powers, power headrooms, and headroom thresholds can be indicated in decibels, watts, or other units of transmit power. It should be understood that the power headrooms can be power headrooms for transmissions of user devices 310-312 or power headrooms for transmissions of transmitter elements of E-UTRAN 331.

As a further example of power headrooms, FIG. 5 is provided. FIG. 5 includes graph 550 illustrating transmit power curve 551 of a user device with transmit power indicated by the 'y' axis over time as indicated on the 'x' axis. As the transmit power curve 551 drops below a headroom threshold, a power headroom thus exceeds the headroom threshold. In graph 550, the power headroom is shown as a difference in power between a headroom threshold and a maximum power. Graph 550 can indicate transmit power for user devices, or alternatively, can indicate transmit power for transmitter elements of E-UTRAN 331.

IWF 333 transfers (405) instructions for receipt by the ones of the user devices, where the instructions indicate to enable CDMA transceiver portions. The instructions can be transferred over LTE signaling pathway 341 and LTE wireless link 330. Responsive to receiving the instructions, the associated user devices can enable CDMA transceiver portions, such as CDMA radio elements, antennas, or circuitry related to exchanging communications over CDMA wireless link 320. Enabling CDMA transceiver portions can also include providing power and initializing circuitry related to CDMA communications, or can include software-based instructions to enable logical communication with CDMA transceiver portions when CDMA transceiver portions are already enabled. Once the CDMA transceiver portions are enabled, then the associated user devices can begin to exchange communications over CDMA wireless link 320, such as receiving overhead signaling for the CDMA communication protocol using CDMA signaling pathway 340 in operation 407.

IWF 333 transfers (406) information identifying the ones of the user devices to switching center equipment associated with CDMA signaling pathway 340. In this example, IWF 333 can transfer the information to MSC 322 which can use this information to responsively begin transferring overhead signaling for the CDMA communication protocol using CDMA signaling pathway 340 for the ones of the user devices. The information can identify the ones of the user devices via an electronic serial number (ESN), mobile identification number (MIN), mobile station identifier (MSID), or other identifier of the ones of the user devices. For example, IWF 333 can transfer at least an identifier for user devices 310 and 311 for receipt by MSC 322. Other elements associated with CDMA signaling pathway 340 can receive the information identifying the ones of the user devices, such as authentication, authorization and accounting (AAA) equipment or home agents.

Wireless communication system 300 transfers (407) the overhead signaling for the CDMA communication protocol using CDMA signaling pathway 340 for receipt by the ones of the user devices. Thus, CDMA wireless link 320 is used for the overhead signaling for the CDMA communication protocol for user devices 310 and 311, while user devices not included in the ones of the user devices, such as user device 312, can continue to receive the overhead signaling for the CDMA communication protocol over LTE wireless link 330 of LTE signaling pathway 341.

As a further example of LTE signaling pathway 341 associated with LTE wireless link 330 and CDMA signaling pathway 340 associated with CDMA wireless link 320, FIG. 5 is provided. FIG. 5 includes second configuration 520 as an example of operation 407 of FIG. 4. LTE wireless link 330 is shown as including communications associated with only LTE communications, while CDMA wireless link 320 is shown including at least CDMA overhead communications for the ones of the user devices having power headrooms exceeding the headroom threshold of operation 404. CDMA wireless link 320 can also include CDMA user communications as indicated in FIG. 5. CDMA user communications can include voice calls, data exchange, or other user communications.

In further examples, transferring to the user devices the overhead signaling for the CDMA communication protocol over LTE signaling pathway 341 can include transferring to the user devices the overhead signaling for the CDMA communication protocol over a first multiple-input multiple-output (MIMO) wireless communication mode. Likewise, transferring the overhead signaling for the CDMA communication protocol using CDMA signaling pathway 340 can include transferring to ones of the user devices the overhead signaling for the CDMA communication protocol over a second MIMO wireless communication mode. The ones of the user devices receiving the overhead signaling for the CDMA communication protocol over the second MIMO wireless communication mode can include the ones of the user devices having power headrooms exceeding the headroom threshold in operation 404, such as user devices 310-311.

Figure 7:
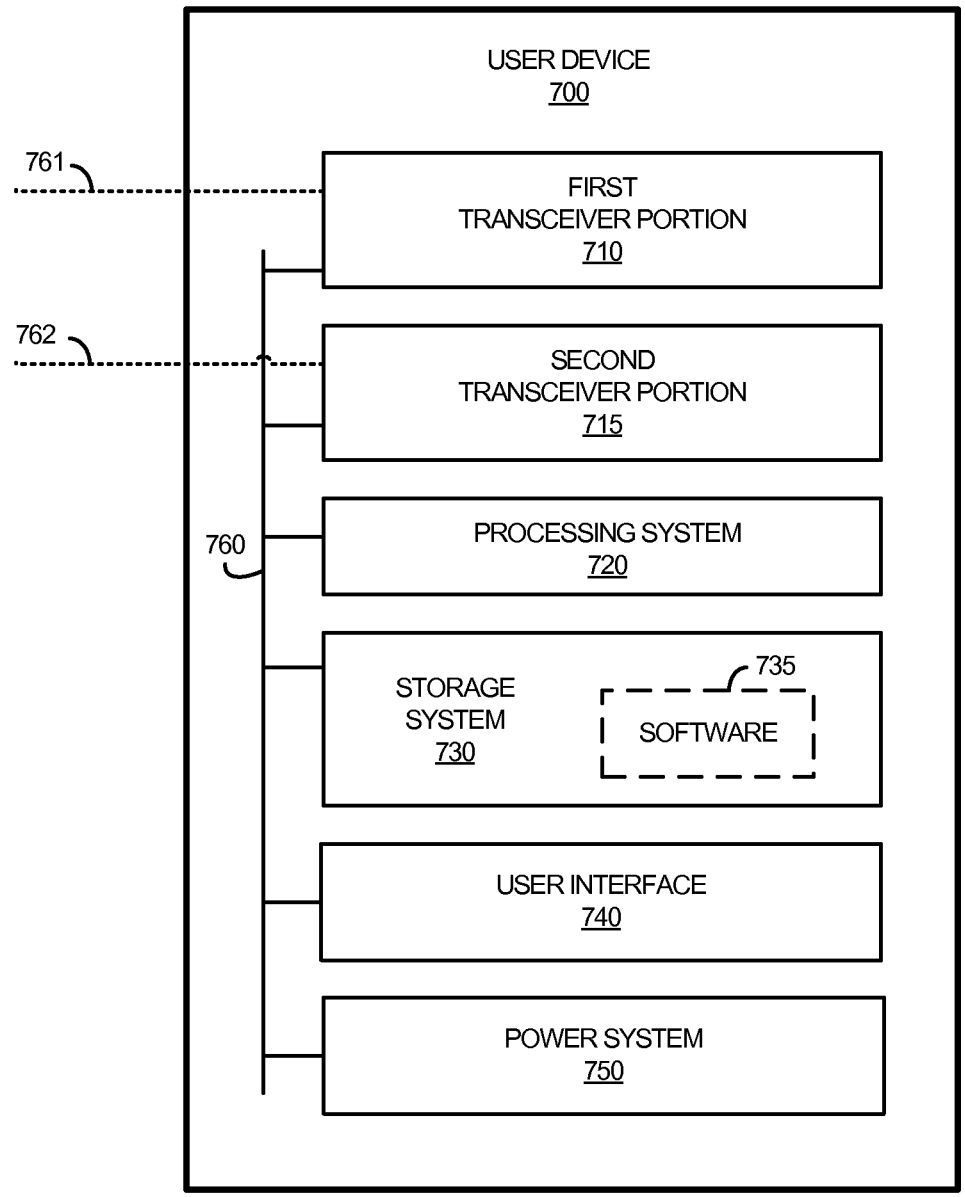
FIG. 7 is a block diagram illustrating a user device.

A user device can include two antennas for use in a dual antenna MIMO configuration, such as user device 700 described in FIG. 7. The first MIMO wireless communication mode can include using a first antenna and a second antenna of a dual antenna MIMO configuration to exchange LTE wireless communications over LTE wireless link 330. The second MIMO wireless communication mode can include using the first antenna of the dual antenna MIMO configuration for the LTE wireless communications over LTE wireless link 330 and the second antenna of the dual antenna MIMO configuration for CDMA wireless communications over CDMA wireless link 320.

Figure 6:
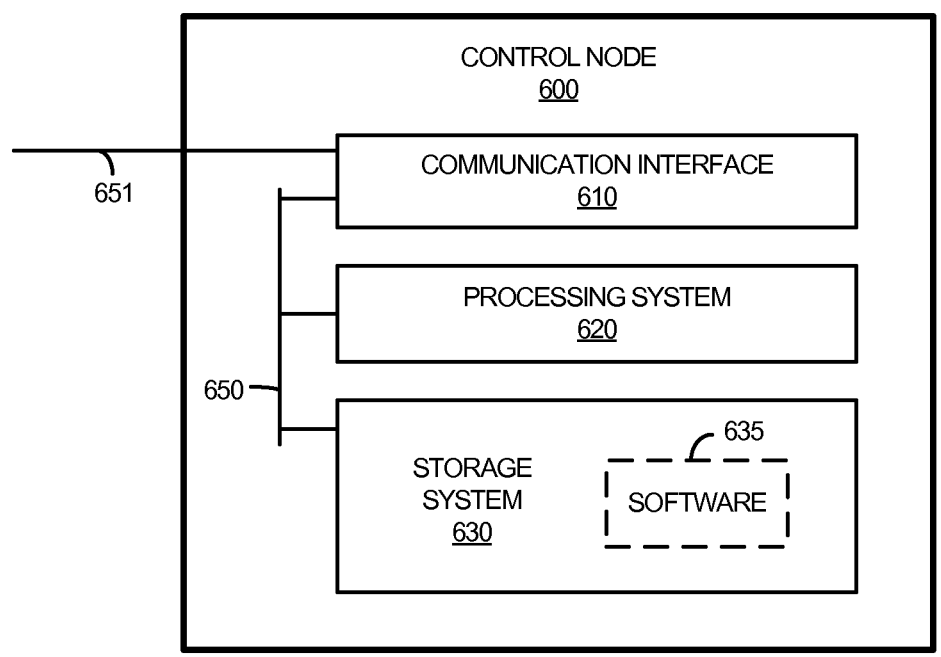
FIG. 6 is a block diagram illustrating a control node.

FIG. 6 is a block diagram illustrating a detailed view of control node 600. Control node 600 can include equipment and systems as discussed herein for control node 125 in FIG. 1, or IWF 333 of FIG. 3, although variations are possible. Control node 600 includes communication interface 610, processing system 620, and storage system 630. In operation, processing system 620 is operatively linked to communication interface 610 and storage system 630 by bus 650. It should be understood that discrete links can be employed, such as network links or other circuitry. Control node 600 can be distributed or consolidated among equipment or circuitry that together forms the elements of control node 600. Control node 600 can optionally include additional devices, features, or functionality not discussed here for purposes of brevity.

Communication interface 610 includes a network interface for communicating with communication networks, such as communication network 120 of FIG. 1 or elements 321, 322, 331, 332, 333, or 360 of FIG. 3. The network interface can include a T1 interface, or local or wide area network communication interfaces which can communicate over an Ethernet or Internet protocol (IP) link. Examples of communication interface 610 include network interface card equipment, transceivers, modems, and other communication circuitry. In this example, communication interface 610 communicates over link 651. Link 651 can include any communication link as described herein, such as that described for link 132 in FIG. 1 or links 352-353 in FIG. 3.

Processing system 620 can comprise one or more microprocessors and other circuitry that retrieves and executes software 635 from storage system 630. Processing system 620 can be implemented within a single processing device but can also be distributed across multiple processing devices or sub-systems that cooperate in executing program instructions. Examples of processing system 620 include general purpose central processing units, application specific processors, and logic devices, as well as any other type of processing device, combinations, or variations thereof.

Storage system 630 can comprise any computer readable storage media readable by processing system 620 and capable of storing software 635. Storage system 630 can include volatile and nonvolatile, removable and non-removable media implemented in any method or technology for storage of information, such as computer readable instructions, data structures, program modules, or other data. In addition to storage media, in some implementations storage system 630 can also include communication media over which software 635 can be communicated. Storage system 630 can be implemented as a single storage device but can also be implemented across multiple storage devices or sub-systems co-located or distributed relative to each other. Storage system 630 can comprise additional elements, such as a controller, capable of communicating with processing system 620. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof, or any other type of storage media. In no case is the storage media a propagated signal.

Software 635 can be implemented in program instructions and among other functions can, when executed by control node 600 in general or processing system 620 in particular, direct control node 600 or processing system 620 to identify control channel congestion for wireless communications of an LTE signaling pathway, instruct wireless communication equipment to transfer overhead communications for non-LTE communication protocols over either LTE or non-LTE signaling pathways, determine wireless communication power headrooms for user devices, instruct user devices to enable or disable transceiver portions, among other operations. Software 635 can include additional processes, programs, or components, such as operating system software, database software, or application software. Software 635 can also comprise firmware or some other form of machine-readable processing instructions executable by processing system 620.

In at least one implementation, the program instructions can include first program instructions that direct processing system 620 to identify control channel congestion for wireless communications of an LTE signaling pathway, instruct wireless communication equipment to transfer overhead communications for non-LTE communication protocols over either LTE or non-LTE signaling pathways, determine wireless communication power headrooms for user devices, instruct user devices to enable or disable transceiver portions, among other operations.

In some implementations, the program instructions can include second program instructions that direct processing system 620 to instruct RAN equipment or user devices to exchange wireless communications using a first MIMO mode using two antennas for LTE communications. Responsive to control channel congestion or other factors while in the first MIMO mode, the second program instructions can direct processing system 620 to instruct RAN equipment or user devices to exchange wireless communications in a second MIMO mode using a first of two antennas for the LTE communications and a second of the two antennas for non-LTE communications. In some examples, the second MIMO mode can be a non-MIMO mode.

In general, software 635 can, when loaded into processing system 620 and executed, transform processing system 620 overall from a general-purpose computing system into a special-purpose computing system customized to identify control channel congestion for wireless communications of an LTE signaling pathway, instruct wireless communication equipment to transfer overhead communications for non-LTE communication protocols over either LTE or non-LTE signaling pathways, determine wireless communication power headrooms for user devices, instruct user devices to enable or disable transceiver portions, among other operations. Encoding software 635 on storage system 630 can transform the physical structure of storage system 630. The specific transformation of the physical structure can depend on various factors in different implementations of this description. Examples of such factors can include, but are not limited to the technology used to implement the storage media of storage system 630 and whether the computer-storage media are characterized as primary or secondary storage. For example, if the computer-storage media are implemented as semiconductor-based memory, software 635 can transform the physical state of the semiconductor memory when the program is encoded therein. For example, software 635 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

Control node 600 can also include other elements, such as user interfaces, computer systems, databases, distributed storage and processing elements, and the like. Control node 600 can be included in the equipment or systems of communication network 120 of FIG. 1 or elements 321, 322, 331, 332, 333, or 360 of FIG. 3, or can be included in separate equipment or systems, including combinations thereof.

FIG. 7 is a block diagram illustrating user device 700, as an example of user devices 110-112 found in FIG. 1 or user devices 310-312 found in FIG. 3, although user devices 110-112 or user devices 310-312 could use other configurations. User device 700 includes first transceiver portion 710, second transceiver portion 715, processing system 720, storage system 730, user interface 740, and power system 750. First transceiver portion 710, second transceiver portion 715, processing system 720, storage system 730, user interface 740, and power system 750 are shown to communicate over a common bus 760 for illustrative purposes. It should be understood that discrete links could be employed, such as data links, power links, RF links, or other links. User device 700 can be distributed or consolidated among equipment or circuitry that together forms the elements of user device 700. User device 700 can optionally include additional devices, features, or functionality not discussed here for purposes of brevity.

First transceiver portion 710 comprises one or more antenna elements and communication interface circuitry for communicating with wireless access nodes of a wireless communication network, such as with base stations of a cellular voice and data network. First transceiver portion 710 could include transceiver equipment and antenna elements for wirelessly exchanging user communications and overhead communications over the associated wireless link 761. First transceiver portion 710 also receives command and control information and instructions from processing system 720 or user interface 740 for controlling the operations of wireless communications over wireless link 761. Wireless link 761 could use various protocols or communication formats as described herein for wireless links 130, 131, 320, or 330, including combinations, variations, or improvements thereof. First transceiver portion 710 also can be enabled or disabled, such as entering into powered or unpowered states, by the command of processing system 720 via control signals received over user interface 740, or links 761-762.

Second transceiver portion 715 comprises one or more antenna elements and communication interface circuitry for communicating with wireless access nodes of a wireless communication network, such as with base stations of a cellular voice and data network. Second transceiver portion 715 could include transceiver equipment and antenna elements for wirelessly exchanging user communications and overhead communications over the associated wireless link 762. Second transceiver portion 715 also receives command and control information and instructions from processing system 720 or user interface 740 for controlling the operations of wireless communications over wireless link 762. Wireless link 762 could use various protocols or communication formats as described herein for wireless links 130, 131, 320, or 330, including combinations, variations, or improvements thereof. Second transceiver portion 715 also can be enabled or disabled, such as entering into powered or unpowered states, by the command of processing system 720 via control signals received over user interface 740, or links 761-762. In some examples, elements of first transceiver portion 710 and second transceiver portion 715 are included in similar circuitry or physical elements.

Processing system 720 can comprise one or more microprocessors and other circuitry that retrieves and executes software 735 from storage system 730. Processing system 720 can be implemented within a single processing device but can also be distributed across multiple processing devices or sub-systems that cooperate in executing program instructions. Examples of processing system 720 include general purpose central processing units, application specific processors, and logic devices, as well as any other type of processing device, combinations, or variations thereof.

Storage system 730 can comprise any computer readable storage media readable by processing system 720 and capable of storing software 735. Storage system 730 can include volatile and nonvolatile, removable and non-removable media implemented in any method or technology for storage of information, such as computer readable instructions, data structures, program modules, or other data. In addition to storage media, in some implementations storage system 730 can also include communication media over which software 735 can be communicated. Storage system 730 can be implemented as a single storage device but can also be implemented across multiple storage devices or sub-systems co-located or distributed relative to each other. Storage system 730 can comprise additional elements, such as a controller, capable of communicating with processing system 720. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof, or any other type of storage media. In no case is the storage media a propagated signal.

Software 735 can be implemented in program instructions and among other functions can, when executed by user device 700 in general or processing system 720 in particular, direct user device 700 or processing system 720 to communicate with wireless access nodes over wireless links, enable or disable transceiver portions of user device 700, and receive wireless access to communication services from wireless access nodes, among other operations. Software 735 can include additional processes, programs, or components, such as operating system software, database software, or application software. Software 735 can also comprise firmware or some other form of machine-readable processing instructions executable by processing system 720.

In at least one implementation, the program instructions can include first program instructions that direct processing system 720 to receive wireless access from an LTE radio access network over a wireless link and receive non-LTE overhead communications over the LTE radio access network, receive an instruction to enable a non-LTE transceiver portion and subsequently receive further wireless access from both an LTE radio access network and a non-LTE radio access network.

In some implementations, the program instructions can include second program instructions that direct processing system 720 to exchange wireless communications using a first MIMO mode using two antennas for LTE communications. Responsive to at least instructions received while in the first MIMO mode, the second program instructions can direct processing system 720 to exchange wireless communications in a second MIMO mode using a first of two antennas for the LTE communications and a second of the two antennas for non-LTE communications. In some examples, the second MIMO mode can be a non-MIMO mode.

In general, software 735 can, when loaded into processing system 720 and executed, transform processing system 720 overall from a general-purpose computing system into a special-purpose computing system customized to communicate with wireless access nodes over wireless links, enable or disable transceiver portions of user device 700, and receive wireless access to communication services from wireless access nodes, among other operations. Encoding software 735 on storage system 730 can transform the physical structure of storage system 730. The specific transformation of the physical structure can depend on various factors in different implementations of this description. Examples of such factors can include, but are not limited to the technology used to implement the storage media of storage system 730 and whether the computer-storage media are characterized as primary or secondary storage. For example, if the computer-storage media are implemented as semiconductor-based memory, software 735 can transform the physical state of the semiconductor memory when the program is encoded therein. For example, software 735 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

User interface 740 includes equipment and circuitry for receiving user input and control, such as for engaging in voice calls or data sessions, among other operations. Examples of the equipment and circuitry for receiving user input and control include push buttons, touch screens, selection knobs, dials, switches, actuators, keys, keyboards, pointer devices, microphones, transducers, potentiometers, non-contact sensing circuitry, accelerometers, or other human-interface equipment. User interface 740 also includes equipment to communicate information to a user of user device 700. Examples of the equipment to communicate information to the user could include displays, indicator lights, lamps, light-emitting diodes, haptic feedback devices, audible signal transducers, speakers, buzzers, alarms, vibration devices, or other indicator equipment, including combinations thereof.

Power system 750 includes circuitry and a power source to provide power to the elements of user device 700. The power source could include a battery, solar cell, flywheel, capacitor, thermoelectric generator, chemical power source, dynamo, or other power source. In some examples, power system 750 receives power from an external source, such as a wall outlet or power adapter. Power system 750 also includes circuitry to condition, monitor, and distribute electrical power to the elements of user device 700.

Bus 760 comprises a physical, logical, or virtual communication link, capable of communicating data, control signals, and communications, along with other information. In this example, bus 760 also includes RF and power distribution elements, such as wires, circuit board traces, or other elements. In some examples, portions of bus 760 are encapsulated within the elements of first transceiver portion 710, second transceiver portion 715, processing system 720, storage system 730, user interface 740, or power system 750, and can be a software or logical link. In other examples, bus 760 uses various communication media, such as air, space, metal, optical fiber, or some other signal propagation path, including combinations thereof. Bus 760 could be a direct link or might include various equipment, intermediate components, systems, and networks.

Referring back to FIG. 1, user devices 110-112 each comprise one or more antennas, transceiver circuitry elements, and communication elements. The transceiver circuitry typically includes amplifiers, filters, modulators, and signal processing circuitry. User devices 110-112 can also each include user interface systems, memory devices, non-transitory computer-readable storage mediums, software, processing circuitry, or some other communication components. User devices 110-112 can each be a user device, subscriber equipment, customer equipment, access terminal, smartphone, telephone, mobile wireless telephone, personal digital assistant (PDA), computer, e-book, mobile Internet appliance, wireless network interface card, media player, game console, or some other wireless communication apparatus, including combinations thereof.

Communication network 120 comprises communication and control systems for providing access to communication services for user devices. Communication network 120 can provide communication services including voice calls, text messages, data access, or other communication services provided over cellular or wireless communication networks. In some examples, wireless communication network 120 includes equipment to provide wireless access to communication services within different coverage areas to user devices, route communications between content providers and user devices, and facilitate handoffs between equipment of different coverage areas, among other operations. Communication network 120 can also comprise elements such as radio access network (RAN) equipment, E-UTRAN Node B equipment, eNodeB equipment, Evolved Node B equipment, Mobility Management Entity (MME) equipment, interworking functions (IWF), Home Subscriber Servers (HSS), Evolved Universal Terrestrial Radio Access (E-UTRA) network equipment, base stations, base transceiver stations (BTS), base station controllers (BSC), mobile switching centers (MSC), home location registers (HLR), radio node controllers (RNC), call processing systems, authentication, authorization and accounting (AAA) equipment, access service network gateways (ASN-GW), packet data switching nodes (PDSN), home agents (HA), mobility access gateways (MAG), Internet access nodes, telephony service nodes, databases, or other communication and control equipment. Communication network 120 can include LTE and non-LTE networks and systems, among other types of cellular communication networks.

Control node 125 comprises systems and equipment for identifying control channel congestion, identifying wireless communication power headrooms of user devices, and indicating to transfer communications over a LTE and non-LTE pathways, among other operations. Control node 125 can include communication or network interfaces, as well as computer systems, microprocessors, circuitry, or some other processing devices or software systems, and can be distributed among multiple processing devices. Examples of control node 125 can also include software such as an operating system, logs, databases, utilities, drivers, networking software, and other software stored on a computer-readable medium. Control node 125 can also include Call Session Control Function (CSCF) equipment, session initiation protocol (SIP) proxy systems, SIP routing systems, SIP monitoring systems, mobile switching centers (MSC), radio access network (RAN) equipment, E-UTRAN equipment, Mobility Management Entity (MME) equipment, interworking functions (IWF), cloud-based systems, database systems, or other systems.

Communication link 132 uses metal, glass, optical, air, space, or some other material as the transport media. Communication link 132 can use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication link 132 can be a direct link or can include intermediate networks, systems, or devices, and can include a logical network link transported over multiple physical links.

Wireless links 130-131 can each use the air or space as the transport media. Wireless links 130-131 each comprises one or more wireless communication links provided over an associated wireless frequency spectrum or wireless frequency band, and can use various protocols. In this example, wireless link 130 comprises a Long Term Evolution (LTE) or LTE Advanced wireless link, including combinations, improvements, or variations thereof. Also in this example, wireless link 131 comprises a non-LTE wireless link such as Code Division Multiple Access (CDMA), Evolution-Data Optimized (EVDO), single-carrier radio transmission technology link (1xRTT), Global System for Mobile Communication (GSM), Universal Mobile Telecommunications System (UMTS), High Speed Packet Access (HSPA), Radio Link Protocol (RLP), 3rd Generation Partnership Project (3GPP) Worldwide Interoperability for Microwave Access (WiMAX), Orthogonal Frequency-Division Multiple Access (OFDMA), Single-carrier frequency-division multiple access (SC-FDMA), Wideband Code Division Multiple Access (W-CDMA), Time Division Synchronous Code Division Multiple Access (TD-SCDMA), IEEE 802.11, Wireless Fidelity (Wi-Fi), or some other cellular or wireless communication format, including combinations, improvements, or variations thereof.

Although one main wireless link for each of wireless links 130-131 is shown in FIG. 1, it should be understood that wireless links 130-131 are merely illustrative to show communication modes or wireless access pathways for user devices 110-112. In other examples, further wireless links can be shown, with portions of the further wireless links shared and used for different communication sessions or different content types, among other configurations.

Communication links 130-132 can each include many different signals sharing the same associated link, as represented by the associated lines in FIG. 1, comprising resource blocks, access channels, paging channels, notification channels, forward links, reverse links, user communications, communication sessions, overhead communications, carrier frequencies, other channels, timeslots, spreading codes, transportation ports, logical transportation links, network sockets, packets, or communication directions.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a wireless communication system, the method comprising:
   transferring, for delivery to user devices, overhead signaling for a non-long term evolution (LTE) communication protocol over an LTE signaling pathway;
   identifying control channel congestion for wireless communications exchanged with the user devices over a LTE signaling pathway; and
   determining when the control channel congestion exceeds a congestion threshold, and responsively transferring the overhead signaling for the non-LTE communication protocol using a non-LTE signaling pathway to ones of the user devices having power headrooms exceeding a headroom threshold,
   wherein transferring to the user devices the overhead signaling for the non-LTE communication protocol over the LTE signaling pathway comprises transferring to the user devices the overhead signaling for the non-LTE communication protocol over a first multiple-input multiple-output (MIMO) wireless communication mode.

2. The method of claim 1, wherein the non-LTE communication protocol comprises Code Division Multiple Access (CDMA), and wherein the overhead signaling for the non-LTE communication protocol comprises circuit switched communication fall back (CSFB) signaling of at least one of call paging signaling, circuit switched voice call signaling, and text message signaling.

3. The method of claim 1, wherein the LTE signaling pathway comprises an S102 interface of an LTE Evolved Universal Terrestrial Radio Access Network (E-UTRAN).

4. The method of claim 3, wherein the non-LTE signaling pathway comprises a Code Division Multiple Access (CDMA) radio access network (RAN).

5. The method of claim 1, further comprising:
   when the control channel congestion exceeds the congestion threshold, responsively transferring instructions for receipt by the ones of the user devices, wherein the instructions indicate to enable non-LTE transceiver portions of the ones of the user devices.

6. The method of claim 1, further comprising:
   when the control channel congestion exceeds the congestion threshold, responsively transferring information identifying the ones of the user devices to switching center equipment associated with the non-LTE signaling pathway.

7. The method of claim 1, wherein transferring the overhead signaling for the non-LTE communication protocol using the non-LTE signaling pathway comprises transferring to the ones of the user devices the overhead signaling for the non-LTE communication protocol over a second multiple-input multiple-output (MIMO) wireless communication mode.

8. The method of claim 7, wherein the first MIMO wireless communication mode comprises using a first antenna and a second antenna of a dual antenna MIMO configuration to exchange LTE wireless communications, and wherein the second MIMO wireless communication mode comprises using the first antenna of the dual antenna MIMO configuration for the LTE wireless communications and the second antenna of the dual antenna MIMO configuration for non-LTE wireless communications.

9. The method of claim 1, wherein the control channel congestion comprises control channel occupancy.

10. A wireless communication system, comprising:
    a communication network configured to transfer, for delivery to user devices, overhead signaling for a non-long term evolution (LTE) communication protocol over an LTE signaling pathway;
    a control node configured to identify control channel congestion for wireless communications exchanged with the user devices over a LTE signaling pathway, and determine when the control channel congestion exceeds a congestion threshold; and
    responsive to the control channel congestion exceeding the congestion threshold, the communication network configured to transfer the overhead signaling for the non-LTE communication protocol using a non-LTE signaling pathway to ones of the user devices having power headrooms exceeding a headroom threshold,
    the communication network configured to transfer to the user devices the overhead signaling for the non-LTE communication protocol over a first multiple-input multiple-output (MIMO) wireless communication mode.

11. The wireless communication system of claim 10, wherein the non-LTE communication protocol comprises Code Division Multiple Access (CDMA), and wherein the overhead signaling for the non-LTE communication protocol comprises circuit switched communication fall back (CSFB) signaling of at least one of call paging signaling, circuit switched voice call signaling, and text message signaling.

12. The wireless communication system of claim 10, wherein the LTE signaling pathway comprises an S102 interface of an LTE Evolved Universal Terrestrial Radio Access Network (E-UTRAN).

13. The wireless communication system of claim 12, wherein the non-LTE signaling pathway comprises a Code Division Multiple Access (CDMA) radio access network (RAN).

14. The wireless communication system of claim 10, comprising:
    when the control channel congestion exceeds the congestion threshold, the communication network configured to responsively transfer instructions for receipt by the ones of the user devices, wherein the instructions indicate to enable non-LTE transceiver portions of the ones of the user devices.

15. The wireless communication system of claim 10, comprising:

when the control channel congestion exceeds the congestion threshold, the communication network configured to responsively transfer information identifying the ones of the user devices to switching center equipment associated with the non-LTE signaling pathway.

16. The wireless communication system of claim 10, comprising:

the communication network configured to transfer to the ones of the user devices the overhead signaling for the non-LTE communication protocol over a second multiple-input multiple-output (MIMO) wireless communication mode.

17. The wireless communication system of claim 16, wherein the first MIMO wireless communication mode comprises using a first antenna and a second antenna of a dual antenna MIMO configuration to exchange LTE wireless communications, and wherein the second MIMO wireless communication mode comprises using the first antenna of the dual antenna MIMO configuration for the LTE wireless communications and the second antenna of the dual antenna MIMO configuration for non-LTE wireless communications.

18. The wireless communication system of claim 10, wherein the control channel congestion comprises control channel occupancy.

* * * * *